United States Patent [19]

Doi et al.

[11] Patent Number: 5,086,140
[45] Date of Patent: Feb. 4, 1992

[54] OPTICAL MATERIAL FORMED BY CASTING POLYMERIZATION OF A PHENYL PHOSPHINE MONOMER

[75] Inventors: Hideaki Doi, Matsudo; Teruo Sakagami, Nerima, both of Japan

[73] Assignee: Kureha Kagaku Kogyo Kabushiki Kaisha, Japan

[21] Appl. No.: 611,464

[22] Filed: Nov. 13, 1990

Related U.S. Application Data

[63] Continuation of Ser. No. 277,980, Nov. 30, 1988, abandoned.

[30] Foreign Application Priority Data

Dec. 28, 1987 [JP] Japan .................. 62-330175

[51] Int. Cl.$^5$ .................. C08F 230/02; C08G 67/02
[52] U.S. Cl. .................. 526/274; 528/392
[58] Field of Search .................. 526/274; 528/392

[56] References Cited

FOREIGN PATENT DOCUMENTS

| | | |
|---|---|---|
| 0277907 | 8/1988 | European Pat. Off. . |
| 1426033 | 12/1965 | France . |
| 60-197711 | 10/1985 | Japan . |
| 61-247715 | 11/1986 | Japan . |
| 63-239460 | 10/1988 | Japan . |

OTHER PUBLICATIONS

Polymer Journal, vol. 19, No. 12, pp. 1351-1357 (1987) "Direct Polycondensation Reaction Using Polymeric Triphenylphosphine as an Initiator", Naoya Ogata, Kohei Sanui, Masayoshi Watanabe, and Hideko Sakai, Dept. of Chem.
Nato ASI Ser., (1987) pp. 179-189, "Novel Polycondensation System for the Synthesis of Polyamides and Polyesters", Ogata.

Primary Examiner—Harold D. Anderson
Assistant Examiner—T. Mosley
Attorney, Agent, or Firm—Parkhurst, Wendel & Rossi

[57] ABSTRACT

An optical material of a high refractive index is formed of a copolymer obtained by polymerizing 10-90 wt. % of a monomer represented by the following formula (I) and 90-10 wt. % of a monomer copolymerizable with the first-mentioned monomer.

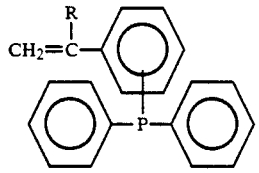

Formula (I)

wherein R is a hydrogen atom or methyl group.

3 Claims, No Drawings

OPTICAL MATERIAL FORMED BY CASTING POLYMERIZATION OF A PHENYL PHOSPHINE MONOMER

This is a continuation of application Ser. No. 07/277,980 filed Nov. 30, 1988, now abandoned.

BACKGROUND OF THE INVENTION

1) Field of the Invention

This invention relates to an optical material, and specifically to an optical material formed of a copolymer containing phosphorus atoms and having a high refractive index.

2) Description of the Related Art

Inorganic glass is now used widely as an optical material for lenses, prisms and the like. Since the inorganic glass employed as an optical material has a specific gravity as high as 2.4-5.2, the optical material has a large weight thereby encountering a problem upon incorporation into optical systems such as office automation equipment for which size and weight reduction is essential. With a view toward overcoming the problem, a great deal of work has been carried out for the development of optical materials having a smaller specific gravity compared to inorganic glass in general and formed of a polymer or copolymer. Some optical materials of the above-mentioned sort have already found actual utility, for example, as spectacle lenses.

A variety of characteristics are required for such optical materials. Among these, high refractive index, small specific gravity, colorlessness and excellent transparency can be mentioned fundamentally as important characteristics. When an optical material to be used as a spectacle lens has a high refractive index and a small specific gravity, the peripheral thickness of the lens can be reduced substantially so that the lens can be provided as a thin lens as a whole. A weight reduction is therefore feasible from this point too. Such an optical material is thus extremely preferred.

However, in case of obtaining a lens from an optical material having a low specific gravity and a low refractive index, it is necessary to reduce the radius of the lens in order to provide a necessary refracting power. As a result, both the thickness and the volume of the lens are increased. Although the weight reduction was sought for, this objective cannot be achieved fully as a consequence. When an optical material is itself colored or has inferior transparency, use of a lens or the like made of such optical material in an optical system tends to result in a problem such that the transmission spectrum is distorted or the transmittance of light of a desired wavelength is lowered. A limitation is therefore imposed on its application field. Such an optical material is hence not desired.

As optical materials having a low specific gravity, polymethyl methacrylate (specific gravity, d: 1.19, refractive index, $n_d$: 1.49), polydiethylene glycol bisallylcarbonate (d: 1.32, $n_d$: 1.50), polycarbonate (d: 1.20, $n_d$: 1.58), polystyrene (d: 1.06, $n_d$: 1.59) are known widely these days. None of these optical materials however have any sufficiently high refractive index.

On the other hand, a variety of proposals has been made on optical materials having a high refractive index. For example, Japanese Patent Publication No. 14449/1983 discloses dimethacrylate or diacrylate copolymers in which each nucleus halogen-substituted aromatic ring is coupled to a methacryloyloxy or acryloyloxy group through an alkylene glycol group. Further, Japanese Patent Laid-Open No. 51706/1985 discloses polymers of a urethanated (meth)acrylic monomer formed by reacting a bromine-substituted aromatic monomer having one or more hydroxyl groups with a polyfunctional isocyanate.

In order to obtain an optical material having a sufficiently high refractive index in accordance with these techniques, it is however indispensable to increase the proportion of the halogen atoms contained. This has lead to a problem that the specific gravity of the optical material becomes high. For example, optical materials of this sort whose refractive indexes $n_d$ are as high as at least 1.60 have a specific gravity d as high as 1.4-2.2 without exception.

Some proposals have also been made regarding optical materials having a high refractive index and a low specific gravity. None of these proposals are however fully satisfactory. Namely, they are accompanied by one or more problems such that they are colored or they are susceptible to coloration or transparency reduction due to their low chemical stability and their production is not easy due to poor solubility of raw materials. There is another problem that the wavelength dependency (dispersion characteristics) of their refractive indexes is great and a limitation is hence imposed on their application as optical materials.

SUMMARY OF THE INVENTION

As a result of an extensive investigation conducted with a view toward solving such problems as mentioned above, it has been found that a colorless optical material having a high refractive index, a small specific gravity and excellent transparency can be obtained from a copolymer of a particular monomer. The present invention has been completed on the basis of the above finding.

In one aspect of this invention, there is provided an optical material of a high refractive index comprising a copolymer obtained by polymerizing 10-90 wt. % of a monomer represented by the following formula (I) and 90-10 wt. % of a monomer copolymerizable with the first-mentioned monomer.

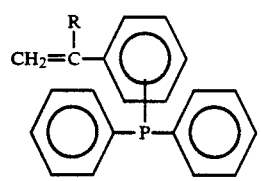

Formula (I)

wherein R is a hydrogen atom or methyl group.

The optical material according to this invention has a high refractive index in spite of its low specific gravity, is colorless and enjoys excellent transparency because it is formed of the copolymer of the particular monomer represented by the formula (I) and containing a phosphorus atom and aromatic rings.

DETAILED DESCRIPTION OF THE INVENTION AND PREFERRED EMBODIMENTS

The optical material according to this invention is formed of a copolymer which is obtained from a monomer composition which contains the monomer represented by the formula (I) as an essential component which may be referred as "monomer (I)" hereinafter.

As specific examples of the monomer (I) represented by the formula (I), may be mentioned diphenyl(p-vinylphenyl)phosphine, diphenyl(p-isopropenylphenyl)phosphine, diphenyl(o-vinylphenyl)phosphine and diphenyl-(o-isopropenylphenyl)phosphine. It should however be borne in mind that the monomer (I) is not necessarily limited to the above specific examples. It is particularly preferred to use the monomer of the formula in which R is a hydrogen atom.

In addition, the monomers represented by the formula (I) may be used either singly or in combination.

No particular limitation is imposed on the monomer (hereinafter called "copolymerizable monomer") copolymerizable with the monomer (I) so long as it is copolymerizable with the monomer (I) employed. As specific examples, the following monomers may be mentioned.

(1) Alkyl (meth)acrylates

For example, methyl acrylate, methyl methacrylate, naphthyl acrylate, naphthyl methacrylate, phenyl acrylate, phenyl methacrylate, trimethylolpropane triacrylate, trimethylolpropane trimethacrylate, ethylene glycol diacrylate, ethylene glycol dimethacrylate, tribromophenyl acrylate, tribromophenyl methacrylate, 2,2-bis-(4-acryloxyethoxy-3,5-dibromophenyl)propane, 2,2-bis-(4-methacryloxyethoxy-3,5-dibromophenyl)propane, 2,2-bis-(4-acryloxy-3,5-dibromophenyl)propane, 2,2-bis-(4-methacryloxy-3,5-dibromophenyl)propane, 2,2-bis-(4-methacryloxyphenyl)propane, 2,2-bis-(4-acryloxyethoxyphenyl)propane, etc.

(2) Aromatic Vinyl Compounds

For example, styrene, α-methylstyrene, divinylbenzene, vinylnaphthalene, m-diisopropenylbenzene, 2-isopropenylnaphthalene, etc.

(3) Allyl Compounds

For example, triallyl isocyanurate, diallyl phthalate, etc.

By choosing a particular monomer to be used actually as the copolymerizable monomer, the present invention can bring about advantages inherent to characteristics of the thus-chosen copolymerizable monomer. It may also be extremely effective to use two or more copolymerizable monomers in combination instead of using only one copolymerizable monomer, because the advantageous effects of the individual copolymerizable monomers may be brought about all together in some instances.

In order to obtain a copolymer having a higher refractive index for example, use of a halogen-containing monomer as a copolymerizable monomer is preferred. From the standpoint of ease in polymerization reaction, it is preferable to use a monomer of a relatively simple structure as a copolymerizable monomer. It may hence be possible to obtain a copolymer, which features an easy polymerization reaction and a high refractive index, by using both of the above monomer in combination.

It is also preferable to use, as the copolymerizable monomer, a polyfunctional monomer containing plural ethylenically-unsaturated polymerizable bonds. Although the monomer (I) contains only one ethylenically-unsaturated polymerizable bond in its molecule, the copolymerizable monomer can act as a so-called crosslinking agent in the above case so that the resultant copolymer has a crosslinked structure. As a consequence, an optical material excellent in solvent and impact resistance can be obtained.

The copolymer according to this invention can be obtained by copolymerizing the above monomer (I) and copolymerizable monomer in proportions of 10–90 wt. % and 90–10 wt. % respectively. If the proportion of the monomer (I) is smaller than 10 wt. % based on the whole monomers, there is a potential problem that the copolymer to be obtained finally would not be a high refractive-index copolymer. On the other hand, any proportions of the monomer (I) in excess of 90 wt. % will result in unduly-marked optical dispersion characteristics (in other words, an unduly small Abbe number) so that a significant limitation will be imposed on the application of the resulting copolymer as an optical material.

The copolymerization reaction between the monomer (I) and the copolymerizable monomer proceeds in accordance with the ordinary radical polymerization reaction mechanism or anionic polymerization reaction mechanism. Conventional polymerization initiator and polymerization process can therefore be used as its polymerization initiator and polymerization process.

When a monofunctional monomer is used as the copolymerizable monomer, a desired optical product can be produced by preparing a copolymer by a usual polymerization process and then molding the copolymer as an optical material by injection molding or the like. As an alternative, a required optical product can also be provided by obtaining a copolymer in a shape other than lens-shapes, such as a plate-like shape, cutting and grinding the copolymer and if necessary, subjecting the resultant piece as a preform to finishing such as surface polishing.

When a polyfunctional monomer is used as the copolymerizable monomer on the other hand, the resulting copolymer has a crosslinked structure. It is hence practically impossible to subject the resultant copolymer to processing which includes a melting or dissolving step. In this case, it is therefore generally preferable to produce an optical material or optical product directly from a monomer composition by casting polymerization.

When casting polymerization is relied upon, any one of molds and forms of various shapes designed in accordance with individual end uses, such plate-like, lens-like, cylindrical, prismatic, conical and spherical shapes, may be used as a casting polymerization vessel. Its material is optional so long as the objects of this invention can be attained, for example, an inorganic glass, a plastic or a metal. The polymerization reaction is effected generally by pouring a mixture of a monomer composition and a polymerization initiator into a casting polymerization vessel and if necessary, heating the contents. It is also feasible to conduct the polymerization to a certain extent in a separate polymerization vessel, pouring the resultant prepolymer or syrup into a casting polymerization vessel and then bringing the reaction to completion.

In the polymerization reaction including casting polymerization, the monomer (I), copolymerizable monomer and polymerization initiator to be used may be mixed together in their entirety at once or may be mixed stepwise.

The monomer composition to be subjected to a polymerization reaction can also contain an antistatic agent, a heat stabilizer, an ultraviolet absorbent, an antioxidant, and/or one or more other auxiliary additives in accordance with the intended end use of the copolymer to be obtained.

Needless to say, the thus-obtained copolymer may be subjected to a post treatment such as heating or annealing for completing the polymerization, for enhancing the surface hardness, for eliminating strain accumulated internally upon the casting polymerization, or for other purpose.

So-called secondary lens processing can also be applied to optical products obtained from the optical material of this invention. For example, optical products may be coated with a silicone-base hard coating material or an organic hard coating material of the u.v. curable type so as to form a hard surface layer, whereby their surface hardness is enhanced. It is also possible to form an anti-reflection film made of a metal oxide or fluoride by vacuum evaporation or sputtering.

Examples of this invention will hereinafter be described. It should however be borne in mind that this invention is by no means limited to or by the following Examples.

Example 1

Diphenyl(p-vinylphenyl)phosphine: 90 wt. parts
Divinylbenzene: 10 wt. parts

The above materials were molten and mixed into a highly-uniform, colorless and transparent melt mixture at 80° C. in a nitrogen atmosphere. The melt mixture was added with 1 part by weight of t-butyl peroxy-3,5,5-trimethyl hexoate as a polymerization initiator and was then reacted in a nitrogen atmosphere at varied temperatures for varied periods, namely, at 80° C. for 15 hours, at 100° C. for 2 hours, and then at 120° C. for 2 hours, so that the polymerization was completed to produce a copolymer.

The copolymer was practically uncolored and colorless. When laser beams of 1 mW energy obtained from a laser oscillator "GLG 5090" (trade name; manufactured by NEC CORP.) were caused to transmit through the copolymer, substantially no scattering was observed. The copolymer was hence recognized to be colorless and to have excellent transparency.

The refractive index and Abbe number of the copolymer were determined at 20° C. by an Abbe's refractometer ("Model 3", trade name; manufactured by Atago Inc.), and its specific gravity was also determined at 20° C. by an automatic gravimeter ("Model D-S", trade name; manufactured by Toyo Seiki Seisaku-Sho, Ltd.). The following results were obtained.
Refractive index, $n_d$: 1.671
Abbe number, $\gamma$: 22.7
Specific gravity, d: 1.14

Example 2

Diphenyl(p-vinylphenyl)phosphine: 35 wt. parts
Styrene: 35 wt. parts
2,2-Bis-(4-methacryloxyethoxy-3,5-dibromophenyl)-propane: 30 wt. parts The above materials were converted under mixing at 60° C. into a highly-uniform, colorless and transparent liquid mixture. The liquid mixture was added with 1 part by weight of lauroyl peroxide as a polymerization initiator and was then reacted at 60° C. for 12 hours, at 100° C. for 1 hour, and then at 120° C. for 1 hour in a nitrogen atmosphere, so that the polymerization was completed to produce a copolymer.

Similar to the copolymer obtained in Example 1, the copolymer was recognized to be colorless and to have excellent transparency.

The refractive index, Abbe number and specific gravity of the copolymer were determined at 20° C. in the same manner as in Example 1.
Refractive index, $n_d$: 1.630
Abbe number, $\gamma$: 26.6
Specific gravity, d: 1.23

Comparative Example 1

In lieu of 35 parts by weight of diphenyl-(p-vinylphenyl)phosphine in Example 2, 35 parts by weight of styrene were used. Namely, a liquid mixture of the following components was prepared.
Styrene: 70 wt. parts
2,2-Bis(4-methacryloxyethoxy-3,5-dibromophenyl)-propane: 30 wt. parts The liquid mixture was added with 1 part by weight of lauroyl peroxide as a polymerization initiator, followed by polymerization under the same conditions as in Example 2 so that a comparative copolymer was produced.

Similar to the copolymer obtained in Example 2, the comparative copolymer was colorless and had transparency.

The refractive index, Abbe number and specific gravity of the comparative copolymer were determined at 20° C. in the same manner as in Example 1.
Refractive index, $n_d$: 1.595
Abbe number, $\gamma$: 30.4
Specific gravity, d: 1.19

Although the specific gravity was low, the refractive index was small.

It is hence apparent from the foregoing that a copolymer of the monomer (I) has a high refractive index and a low specific gravity.

Example 3

Diphenyl(p-vinylphenyl)phosphine: 40 wt. parts
Styrene: 25 wt. parts
2,4,6-Tribromophenyl methacrylate: 5 wt. parts
2,2-Bis-(4-methacryloxyethoxy-3,5-dibromophenyl)-propane: 30 wt. parts The above materials were converted under mixing at 70° C. into a highly-uniform, colorless and transparent liquid mixture. The liquid mixture was cooled down to 60° C., followed by an addition of 1 part by weight of lauroyl peroxide as a polymerization initiator. In a nitrogen atmosphere, they were reacted at 60° C. for 12 hours, at 100° C. for 1 hour, and then at 120° C. for 1 hour, so that their polymerization was completed to produce a copolymer.

Similar to the copolymer obtained in Example 1, the copolymer was recognized to be colorless and to have excellent transparency.

The refractive index, Abbe number and specific gravity of the copolymer were determined at 20° C. in the same manner as in Example 1.
Refractive index, $n_d$: 1.645
Abbe number, $\gamma$: 25.9
Specific gravity, d: 1.31

Comparative Example 2

Tribromophenyl methacrylate, a bromine-substituted aromatic monomer, was used in place of 40 parts by weight of diphenyl(p-vinylphenyl)phosphine and 25 parts by weight of styrene. Namely, the following materials were converted under mixing at 135° C. into a highly-uniform liquid mixture.

2,4,6-Tribromophenyl methacrylate: 70 wt. parts 2,2-Bis(4-methacryloxyethoxy-3,5-dibromophenyl)-propane: 30 wt. parts The liquid mixture was cooled down to 80° C., followed by an addition of 1 part by weight of t-butyl-peroxy-3,5,5-trimethyl hexoate as a polymerization initiator. In a nitrogen atmosphere, they were reacted at 80° C. for 12 hours, at 100° C. for 1 hour, and then at 120° C. for 1 hour, so that their polymerization was completed to produce a comparative copolymer.

In the above polymerization reaction, the reaction product was tinged in a yellow color as the polymerization proceeded. The resultant comparative copolymer had a yellow color and was inferior in transparency.

When the refractive index, Abbe number and specific gravity of the comparative copolymer were determined at 20° C. in the same manner as in Example 1, they were found to be as follows:

Refractive index, $n_d$: 1.640

Abbe number, $\gamma$: 29.4

Specific gravity, d: 2.02

Although the comparative copolymer had the high refractive index like that obtained in Example 3, its specific gravity was very large.

Example 4

Diphenyl(p-isopropenylphenyl)-phosphine: 35 wt. parts

Styrene: 35 wt. parts 2,2-Bis-(4-methacryloxyethoxy-3,5-dibromophenyl)-propane: 30 wt. parts The above materials were converted under mixing at 65° C. into a highly-uniform, colorless and transparent liquid mixture. The liquid mixture was polymerized under similar conditions as in Example 2, thereby producing a copolymer.

Similar to the copolymer obtained in Example 2, the copolymer was recognized to be colorless and to have excellent transparency.

The refractive index, Abbe number and specific gravity of the copolymer were determined at 20° C. in the same manner as in Example 1.

Refractive index, $n_d$: 1.629

Abbe number, $\gamma$: 26.8

Specific gravity, d: 1.22

We claim:

1. An optical material of a high refractive index comprising a copolymer obtained by polymerizing about 10 to about 90 weight percent of a phenyl phosphine monomer of the formula

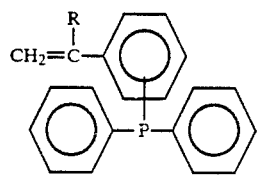

wherein R is a hydrogen atom or a methyl group and about 90 to about 10 weight percent of a copolymerizable monomer selected from the group consisting of an aromatic monomer containing one or more halogen groups and a polyfunctional monomer containing plural ethylenically-unsaturated polymerizable bonds.

2. The optical material as claimed in claim 1, wherein the monomer copolymerizable with the copolymerizable monomer is an aromatic monomer containing one or more halogen atoms.

3. The optical material as claimed in claim 1, wherein the monomer copolymerizable with the copolymerization monomer is a polyfunctional monomer containing plural ethylenically-unsaturated polymerizable bonds.

* * * * *